United States Patent [19]

Viola et al.

[11] Patent Number: 4,755,330
[45] Date of Patent: Jul. 5, 1988

[54] PROCESS FOR PREPARING NEUTRAL AND FUNCTIONAL PERFLUOROPOLYETHERS WITH CONTROLLED MOLECULAR WEIGHT

[75] Inventors: Gian T. Viola, Paullo; Gerardo Caporiccio; Giuseppe Marchionni, both of Milan, all of Italy

[73] Assignee: Ausimont S.p.A., Milan, Italy

[21] Appl. No.: 736,709

[22] Filed: May 22, 1985

[30] Foreign Application Priority Data

May 23, 1984 [IT] Italy ................... 21051 A/84
May 23, 1984 [IT] Italy ................... 21052 A/84

[51] Int. Cl.⁴ ........................................ C07C 59/315
[52] U.S. Cl. ............................. 260/544 F; 568/615
[58] Field of Search ................... 260/544 F; 568/615

[56] References Cited

U.S. PATENT DOCUMENTS 3,250,808  5/1966  Moore et al. .................. 260/544 F
3,985,810  10/1976 von Halasz et al. ................ 568/615

FOREIGN PATENT DOCUMENTS 148482   7/1985  European Pat. Off. .
2632837  2/1977  Fed. Rep. of Germany .
1383927  11/1964 France .

OTHER PUBLICATIONS

Shinn, Dennis B. et al. *Inorganic Chemistry*, vol. 5 (1966) pp. 1937–33.
Staritzky et al. *Analytical Chemistry*, vol. 29 (1957) page 984.

*Primary Examiner*—Paul J. Killos
*Attorney, Agent, or Firm*—Stevens, Davis, Miller & Mosher

[57] ABSTRACT

A process for decomposing perfluoropolyethers to products with a controlled molecular weight, comprising heating the perfluoropolyethers at temperatures of from 150° to 380° C. with 0.1%–2% by weight of a catalyst comprising a fluoride and/or oxyfluoride of Al, Ti, V, Co or Ni; and in case to fluorination at high temperatures to obtain completely neutral perfluoropolyethers.

5 Claims, No Drawings

PROCESS FOR PREPARING NEUTRAL AND FUNCTIONAL PERFLUOROPOLYETHERS WITH CONTROLLED MOLECULAR WEIGHT

BACKGROUND OF THE INVENTION

It is known to prepare polyperoxy perfluoropolyethers by photochemical oxidation of fluoroolefins as it is described in particular in British Pat. No. 1,104,482.

It is also known to prepare perfluoropolyethers stable at high temperatures, obtained from the above polyperoxy perfluoropolyethers by heating them or by using suitable reducing compounds as it is described in particular in British Pat. No. 1,226,566.

By using perfluoropropene as starting compound, in the processes described in the two above patents, compounds of general formula:

$$A-O(-CF_2-CF(CF_3)-O)_m-(CF_2O)_n-(CFO(CF_3))_r-Z \qquad (I)$$

are obtained, wherein A is $-CF_3$, $-C_2F_5$, $-C_3F_7$ and Z is an acid group $$-C(=O)F$$

or a derivative thereof or a group $-CO-CF_3$.

The monomeric units with indexes m, n and r are randomly distributed along the chain of the perfluoropolyether; m, n and r are integers from 0 to 200, their values depending on the photo-oxidation reaction conditions, and the value of $m+n+r$ being always greater than zero.

By using tetrafluoroethylene as starting compound perfluoropolyethers of general formula:

$$B-O(-CF_2CF_2-O)_p-(CF_2)_q-Z \qquad (II)$$

are obtained, wherein B is $-CF_3$, $-C_2F_5$ and Z is an acid group $$-C(=O)F$$

or a derivative thereof; the monomeric units with indexes p and q are randomly distributed along the chain of the perfluoropolyether; p and q are integers and p/q is comprised between 0.5 and 2 (extremes included), and their values depend on the photo-oxidation reaction conditions.

There are also known perfluoropolyethers obtained by polymerization in the presence of anionic catalysts of perfluoropropene epoxide, as it is described for example in U.S. Pat. No. 3,250,808, having general formula:

$$CF_3CF_2CF_2O-(CF(CF_3)-CF_2O)_m-Y \qquad (III)$$

wherein Y is an acyl fluoride group $$-CF(CF_3)-C(=O)F,$$

and m is an integer greater than zero.

The perfluoropolyethers of the three classes above can be subjected to known treatments in order to obtain neutral perfluoropolyethers. An example of the above treatments consists in heating the perfluoropolyether at temperatures of from 100° to 200° C. in the presence of fluorine.

The general formulae of the perfluoropolyethers obtained are:

$$A-O(-C_3F_6O)_m-(CF_2O)_n-(CFO(CF_3))_r-A' \qquad (IV)$$

in which A and A', equal or different, can be $-CF_3$, $-C_2F_5$ or $-C_3F_7$; m, n, and r have the meaning indicated above;

$$B-O-(CF_2CF_2O)_p-(CF_2O)_q-B' \qquad (V)$$

in which B and B', equal or different, are $-CF_3$ or $-C_2F_5$; p and q have the meaning already indicated;

$$C_3F_7-O-(C_3F_6O)_m-R_f \qquad (VI)$$

in which $R_f$ is $-C_2F_5$ or $-C_3F_7$; m is an integer greater than zero.

THE PRESENT INVENTION

An object of the present invention is a process for decomposing perfluoropolyethers having generale formulae IV, V, VI comprising heating at temperatures ranging from 150° to 380° C. in the presence of a catalyst comprising fluorides and/or oxyfluorides of Al or Ti, or V or Co or Ni, or mixtures of the same, in amounts corresponding to 0.1% to 2% by weight on the perfluoropolyethers.

Applicants have surprisingly found that, in the presence of an above catalyst, the perfluoropolyether chain, independently from the distribution of the monomeric units present in the chain, is decomposed to form shorter perfluoropolyether chains having terminal groups:

$$-CF_2-CF(CF_3)-O-CF_2X \qquad -O-CF(CF_3)-CF_2-O-CF_2X$$

$$-O-CF_2-C(=O)(CF_3) \qquad -O-CF(CF_3)-C(=O)F$$

in which $X=F$, $-CF_3$, $-CF_2-CF_3$.

Thus, it is possible to obtain the decomposition of the perfluoropolyether chain with formation of perfluoropolyethers having a lower number of monomeric units by suitably modifying the reaction conditions, as temperature, reaction time, concentration and type of catalyst utilized.

It is also possible to use as starting perfluoropolyether a compound of the classes I, II and III. In this case however it is necessary to use a greater amount of catalyst, and greater temperatures and times of the decomposition treatment, but always in the ranges above indicated.

By selecting the operative conditions above and the characteristics of the catalyst employed it is possible, therefore, to obtain perfluoropolyethers having prevailingly the average molecular weight desired, starting from perfluoropolyethers having a higher molecular weight.

A further advantage obtainable by the process of the present invention resides in that it is possible to modify the molecular weight distribution of the perfluoropolyether deriving from an usual perfluoropolyether preparation by increasing the most useful fractions. An important flexibility degree is therefore obtained with the process of the present invention for preparing products having a determined molecular weight, from which, as is known, depend the viscosity and vapor pressure of the products.

The conditions for achieving the object of the invention are:

(a) maintaining the temperature in the range of from 150° to 380° C.;

(b) amount and type of the catalyst utilized.

The catalyst amount to be used ranges from 0.1% to 2% by weight referred to the perfluoropolyether, depending on the catalytic activity.

Suitable catalysts for the process according to the invention can also be obtained by starting from any compound of the above defined elements, different from fluorides and oxyfluorides, provided that, in the reaction conditions, such compounds be capable of forming, at least in part, the corresponding fluorides or oxyfluorides, for the releasing of fluorine from the perfluoropolyether to be treated.

In the case of cobalt and nickel the Applicant has found that very efficient catalysts are represented by the trifluorides. Good results are obtained also by using other halides of Ni and/or Co, provided that a flow of gaseous fluorine is used, the fluorine providing the formation "in situ" of the trifluoride.

A titanium compound preferably used is $TiOF_2$.

A catalyst particularly suitable for the process according to the invention is represented by aluminum fluoride having specific structure and morphologic characteristics.

Allotropic structures in which $AlF_3$ is present are known, as well as the methods of obtaining the same, in particular reference will be made hereinafter to alpha, beta, gamma and delta structures, characterized by the X-ray powder diffraction spectrum reported in the technical literature (Joint Committee Powder Diffraction Standards 1981 and French Pat. No. 1,383,927-Du Pont).

A further important characteristic, which is indicative of the catalytic activity degree, is the free acidity value determined as irreversibly fixed ammonia. The determination is carried out as follows: the sample of $AlF_3$ is dried at 100° C. for 2 hours, it is weighed (about 1 g) and introduced into a container, then gases are removed under vacuum (residual pressure below $10^{-5}$ Torr) at 100° C. during 3 hours. The $NH_3$ isothermic absorption is then determined at 100° C. and at a pressure from 50 to 400 Torr. The volume of $NH_3$ absorbed (Vass.) linearly depends on the pressure (P) according to the equation:

$$Vass. = A \cdot P + B$$

The value of B (intercept for P=O) is assumed as "total absorbed $NH_3$ at 100° C.".

Then it is degased for 1 hour at 100° C. under vacuum (residual pressure below $10^{-5}$ Torr). The $NH_3$ isothermic absorption is determined again at 100° C. and in a pressure range of from 50 to 400 Torr. The $NH_3$ absorbed volume (Vass.) is expressed by the equation:

$$Vass. = A' \cdot P + B'$$

wherein $A'' = A$.

The value B-B' is assumed as "irreversibly $NH_3$ absorbed at 100° C.".

The values determined for the $AlF_3$ utilized as catalysts in the examples are indicated hereinbelow:

| catalyst type: | | I | II | III | IV | V |
|---|---|---|---|---|---|---|
| crystalline phase $\gamma_c$: | about | 85% | 70% | 60% | — | — |
| crystalline phase $\delta_c$: | about | 15% | 30% | 40% | — | — |
| crystalline phase $\beta_c$: | | traces | traces | traces | — | — |
| crystalline phase $\alpha$: | | — | — | — | 100% | — |
| crystalline phase $\gamma_s$: | | — | — | — | — | 100% |
| Specific surface (m²/g): | | 16.8 | 15.4 | 13.6 | 6.4 | 14 |
| Irreversibly $NH_3$ absorbed at 100° C., in micro eq./g.: | | 9.2 | 8.8 | 5.9 | 2.9 | 7.5 |

$\gamma_c$, $\delta_c$ and $\beta_c$ phases described above are in particular reported in French Pat. No. 1,383,927 by J. Christoph and J. Teufer.

$\gamma_s$ phase is described by Crocket and Maenpler in Inorg. Chem. 5 No. 11, pages 1927–33 (1966); $\alpha$-phase is described in Anal. Chem. 29, 984 (1957).

$AlF_3$ phases having the most valuable catalytic properties in the process according to the present invention are crystalline gamma and/or delta form, having a free acidity corresponding to an irreversible $NH_3$ absorption equal to at least 2.9 micro eq/g.

The product obtained according to the process of the present invention prevailingly consists (up to 95% by weight) of perfluoropolyethers having neutral terminals.

Said perfluoropolyether can be subjected to fluorination at temperatures ranging from 120° to 250° C. in order to obtain completely neutral perfluoropolyether, having formalae:

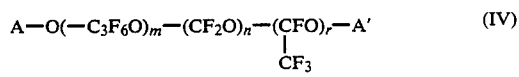

(IV)

in which A and A' equal or different, can be $-CF_3$, $-C_2F_5$ or $-C_3F_7$; m, n, and r have the meaning indicated above;

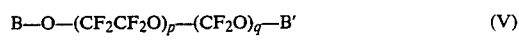

(V)

in which B and B', equal or different, are $-CF_3$ or $-C_2F_5$; p and q have the meaning already indicated;

$$C_3F_7-O-(C_3F_6O)_m-R_f \quad (VI)$$

in which $R_f$ is $-C_2F_5$ or $-C_3F_7$; m is an integer greater than zero.

The AlF$_3$ catalyst can also be prepared in situ during the reaction by adding anhydrous AlBr$_3$ to the starting perfluoropolyether. In fact, under the reaction conditions it is possible to have bromine substituted by the fluorine released by the perfluoropolyether.

The following examples are given only for illustrative purposes and are not to be considered however as limiting the present invention. The viscosity has been determined at 20° C.

EXAMPLE 1

500 g of perfluoropolyether (PFPE) from C$_3$F$_6$ (formula IV) having a viscosity of 1382 c.St. were additioned with 5 g of AlF$_3$ of type I. After 15-minute reaction at a temperature of 303° C. there were collected, after filtration of AlF$_3$, of 375 g of oil having a viscosity equal to 40 c.St. (corresponding to an average molecular weight of 1500 a.m.u.) and an acidity equal to 0.2 m.eq.KOH/g. In the dry ice trap, in which the volatile reaction products had been collected, 50 g of PFPE exhibiting a viscosity of 4 c.St. and an average molecular weight of 640 a.m.u. and a acidity equal to 0.4 m.eq.-KOH/g (milliequivalents) were recovered.

Distillation under vacuum with rectification of the acid product at 40 c.St., yielded 150 g of heat products having a viscosity of 8 c.St., which introduced into a cylindrical photochemical reactor of 150 ml volume, were irradiated for 18 hours by means of a Hanau lamp TQ 150 which emitted in the area 250–300 millimicron a flux of $1.5 \cdot 10^{-3}$ Einstein/minute.

After such irradiation period, 145 g of an oil having a viscosity of 12 c.St. and an acidity of 0.01 m.eq.KOH/g were obtained.

The complete neutralization occurred with KOH at 220° C. in an autoclave according to what is described in British Pat. No. 1,104,482: 135 g of a neutral oil having a viscosity of 15 c.St. were obtained.

EXAMPLE 2

500 g of a PFPE from C$_3$F$_6$ (formula IV) having an average molecular weight equal to 6500 a.m.u. and a viscosity of about 1400 c.St. were heated in a flask, equipped with a refrigerator, a solid CO$_2$ trap and a stirrer, up to a temperature of 150° C. and then 10 g of AlF$_3$ (2% by weight) of type II, obtained by treating type I at 520° C. for 3 hours, were added.

The reactor temperature was then brought to 280° C. during 30 minutes and maintained at such temperature for further 30 minutes. At the end of the test and after filtration, 453 g of oil with a numeral average molecular weight, of 1770 a.m.u., a viscosity of 58 c.St. and an acidity equal to 0.3 m.eq.KOH/g were obtained, while in the CO$_2$ trap there were recovered 22 g of a PFPE having an average molecular weight of 850 a.m.u. and an acidity equal to 0.5 m.eq.KOH/g of oil.

The fluorination of the product having a molecular weight of 1770 a.m.u. was carried out by bubbling a fluorine flow of 10 l/h for 8 hours at a temperature of 130° C., and gave 445 g of a neutral PFPE having a viscosity of 90 c.St.

A first portion of 220 g was distilled under vacuum rectification, to obtain a neutral PFPE having a viscosity of 61 c.St. 60 g of said perfluoropolyether were obtained having a vapor pressure, at 20° C. of $2\times10^{-7}$ Torr.

A second portion of 220 g was distilled under vacuum with rectification to obtain a neutral PFPE having a viscosity of 147 c.St. 92 g of said PFPE having a vapor pressure, at 20° C., of $4\times10^{-8}$ Torr were obtained.

In such case, 54 g of an undistilled residue having a viscosity of 750 c.St. were collected.

EXAMPLE 3

Example 2 was repeated but using the same catalyst type in amounts equal to 1% by weight referred to PFPE, and a reaction time of 60 minutes and at a temperature of 300° C. There were obtained, after filtration, 475 g of an oil having a viscosity of 175 c.St., an average molecular weight of 2850 a.m.u. and an acidity of 0.15 m.eq.KOH/g of oil.

In the dry ice trap, 7 g of a product having a viscosity of 2 c.St. and an average molecular weight of 650 a.m.u. were collected.

The product above, after neutralization by treatment with fluorine, yielded 467 g of neutral oil having a viscosity of 195 c.St. and an average molecular weight equal to 2910 a.m.u. A portion of 230 g was distilled under vacuum with rectification, to obtain a neutral oil having a viscosity equal to 60.5 c.St. 48 g of PFPE having a vapor pressure (20° C.) of $3\times10^{-7}$ Torr, were obtained. A second portion of 236 g was distilled to obtain a product having a viscosity of 140 c.St. 113 g of said PFPE having a vapor pressure (20° C.) of $8\times10^{-9}$ Torr and 104 g of an undistillable residue having a viscosity of 755 c.St. and an average molecular weight of 5050 a.m.u. were obtained.

EXAMPLE 4

492 g of PFPE from C$_3$F$_6$ (formula IV) having viscosity 1221 c.St. and 10 g of AlF$_3$ phase of type IV, were heated to 360° C. and kept under stirring at such temperature for 8 hours.

After filtration of AlF$_3$, 468 g of PFPE having a viscosity of 403 c.St. and an acidity of 0.2 m.eq.KOH/g of oil were obtained.

EXAMPLE 5

10 g of AlF$_3$ of type III, obtained by heating type I to 550° for 8 hours, were utilized under the same modalities of example 2, but at a temperature of 310° C. for 30 minutes. Starting from 500 g of PFPE of the same type as used in example 2, there were obtained 490 g of an oil having a viscosity of 246 c.St. and an acidity equal to 0.05 m.e.KOH/g of oil.

EXAMPLE 6

By decomposing (NH$_4$)$_3$AlF$_6$ at 400° C. in nitrogen, 10 g of AlF$_3$ type V were prepared.

The catalyst so obtained was utilized according to the same modalities as example 2, but for a time of 15 minutes, and starting from 500 g of PFPE of the type used in example 2. 485 g of an oil having a viscosity of 85 c.St. and an acidity equal to 0.17 m.eq.KOH/g of oil were obtained.

EXAMPLE 7

Into a 4-neck flask of 1 liter capacity, equipped with a stirrer, a thermometer, a heated dropping funnel and a heated 50-cm Vigreux column with heat without reflux, there were charged 1000 g of PFPE from C$_3$F$_6$ (formula IV) having a viscosity of 1382 c.St. and 5 g of AlF$_3$ of type I; into the dropping funnel there were charged 960 g of the same perfluoropolyether, which were totally fed in 120 minutes into the flask.

During the reaction there were distilled 1230 g of PFPE having a viscosity of 3.25 c.St. and an acidity of 0.38 m.eq.KOH/g, and there were collected as a residue, 400 g of a PFPE having a viscosity of 46 c.St. in the reactor.

EXAMPLE 8

(degradation of PFPE, Krytox type)

5 g of $AlF_3$ of type II were added to 500 g of a perfluoropolyether having a viscosity of 990 c.St., obtained by anionic polymerization of

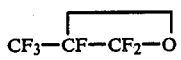

with CsF, according to U.S. Pat. No. 3,250,808 (Du Pont) and then neutralized with $F_2$ at 150° C.

After heating to 300° C. during 120 minutes under stirring, 450 g of a product having a viscosity of 175 c.St. and an acidity equal to 0.05 m.eq.KOH/g were obtained.

Such product showed interesting structural variations revealed by spectroscopic NMR analysis (carried out at 200 Mc): in particular, with respect to the starting product, there were observed an increase in the number of $CF_3CF_2CF_2O-$ terminals, a decrease in the number of $CF_3CF_2OCF_2CF(CF_3)O-$ terminals, and the appearance of $CF_3CF_2OCF(CF_3)CF_2O-$ and of $(CF_3)_2CF-O-(CF_3)_2CFCF_2-$ terminals.

The ratio between the signals of n-propyl terminals and the sum of the ethyl terminals is equal to 0.25 in the treated product; while in the starting material said ratio is comprised between 1 and 1.5.

EXAMPLE 9

1000 g of a perfluoropolyether having a viscosity of 1450 c.St., obtained by photo-oxidation of perfluoropropene and then reduced and neutralized with $F_2$, were treated with 1% by weight of $AlBr_3$ at 180° C. for 20 minutes; 920 g of PFPE having a viscosity of 90 c.St were obtained.

The product filtered gave 2.9 g of a crystalline substance which, subjected to analysis, resulted to prevailingly consist of $AlF_3$ type I.

Such product, washed with Freon 113 and dried under vacuum, was added, in the amount of 0.2%, to a PFPE having a viscosity of 1450 c.St, at 250° C. under stirring.

After 10 minutes, 70% of the starting PFPE having a viscosity of 30 c.St was recovered.

EXAMPLE 10

3000 g of a perfluoropolyether oil from $C_3F_6$ (formula IV) having a numeral average molecular weight equal to 6380 a.m.u. were heated in a flask equipped with a refrigerator, a $CO_2$ trap and a stirrer, up to a temperature of 180° C. Then 15 g of $AlBr_3$ were added and, maintaining the mass under stirring, the temperature was brought to 200° C. in a time of 20 minutes. After cooling, the reagent mass was filtered and 2800 g of a product having a numeral average molecular weight equal to 1480 a.m.u. and an acidity equal to 1.02 m.eq.-KOH/g of oil were obtained. The calculated functionality determined from the MW/EW (molecular weight/equivalent weight) ratio was 0.74.

After neutralization with KOH, the oil was subjected to stream distillation and 728 g of a neutral product were collected.

The undistillable product showed an acidity equal to 0.67 m.eq.KOH/g of oil, and a functionality equal to 1.

Almost the same result was obtained by counting the neutral and acid terminals, determinable by means of NMR, then calculating the ratio.

In the dry ice trap there were collected 135 g of a complex mixture of acid and neutral products having a low average molecular weight, and furthermore 12 g of bromine.

EXAMPLE 11

By operating as in the Example 10, 26 g of $AlBr_3$ were added to 3000 g of perfluoropolyether oil having an average numeral molecular weight equal to 4750 a.m.u.

After filtration, 2580 g of a product having an average numeral molecular weight equal to 1010 a.m.u. and an acidity of 1.58 m.eq.KOH/g of oil, with a functionality of 0.63 were obtained.

After neutralization with KOH and stream distillation 516 g of a neutral product were collected. The distillation residue showed an acidity of 0.99 m.eq.-KOH/g, and a functionality equal to 1.

210 g of a mixture of acid and neutral perfluoropolyethers and 23 g of bromine were collected in the dry ice trap.

EXAMPLE 12

A portion of the potassium salt of the PFPE acid obtained in example 11 was accurately dried under vacuum at 104° C. for 24 hours. 500 g of the product obtained were heated for 4 hours at a temperature of 250° C. At the end of the reaction, a weight loss equal to 20.5 g, corresponding to the formation of about one $CO_2$ molecule per two molecules of starting product, was observed. On I.R. analysis the product showed the typical band of the vinylether double bond at 1850 $cm^{-1}$.

EXAMPLE 13

3 g of $CoCl_2$ (0.3% by weight) were added to 1000 g of a perfluoropolyether obtained by starting from $C_3F_6$ and having viscosity of 1400 c.St. The perfluoropolyether containing $CoCl_2$ was charged in a glass reactor fitted with reflux condenser, stirrer, dry ice trap and temperature automatic control. The temperature was raised to 220° C. and was kept at this temperature for 13 hours. During this time gaseous fluorine was continuously introduced at a flow rate of 10 l/hour. There were obtained 790 g of neutral perfluoropolyether having viscosity of 350 c.St and in the dry ice trap. 109 g of low-boiling products were collected.

EXAMPLE 14

In the reactor of the preceding example, 1000 g of a perfluoropolyether of the same type of the preceding example were charged together with 15 g of $CoCl_2$ (1.5% by weight). The temperature was raised at 220° C. and at this temperature the reaction mixture was kept for 13.5 hours, under a flow of gaseous fluorine (flow rate 10 l/hour). 716 g of neutral perfluoropolyether having viscosity 166 c.St. were obtained.

In dry ice trap 147 g of low-boiling compound were collected.

EXAMPLE 15

500 g of PFPE from $C_2F_4$ (formula V) having a viscosity of 260 c.St. and 5 g of $AlF_3$ in the α-form (type IV) were placed in a flask equipped with a stirrer, thermometer, a refluxing refrigerator and a $CO_2$ trap.

The temperature was raised to 250° C. and the reaction mixture was left at said temperature for 3 hours.

Then the mixture was filtered and 446 g of PFPE having a viscosity of 142 c.St. were obtained. In the trap 35 g of PFPE having a viscosity of 25 c.St. were recovered.

EXAMPLE 16

Example 15 was repeated but using 10 g of $AlF_3$.

403 g of PFPE having a viscosity of 65 c.St. were obtained. In the trap 42 g of PFPE having a viscosity of 2.3 c.St. were collected.

What is claimed is:

1. A process for the scission of perfluoropolyethers selected from those having one of the following general formulae:

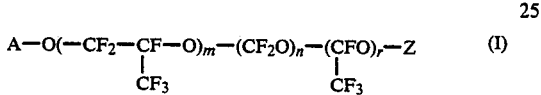

in which A is $-CF_3$; $-C_2F_5$; $-C_3F_7$ and Z is A or an acid group $-COF$ or a derivative thereof, or the group $-CO-CF_3$;

the monomeric units with indexes m, n and r are randomly distributed along the chain of the perfluoropolyether, m, n and r are integers from 0 to 200, and the value of m+n+r being always greater than zero;

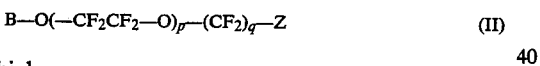

in which

B is $-CF_3$, $C_2F_5$; and

Z is B or an acid group $-COF$ or a derivative thereof, the monomeric units with indexes p and q are randomly distributed along the chain of the perfluoropolyether, p and q are integers and p/q is from 0.5 to 2, extremes included;

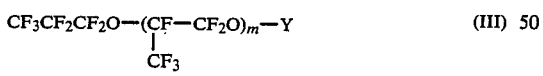

in which

Y is an acyl fluoride group $-CF(CF_3)COF$ and m is an integer greater than zero;

said process comprising heating the perfluoropolyether at a temperature from 150° C. to 380° C. in the presence of a catalyst comprising a fluoride and/or oxyfluoride of a metal selected from the group consisting of aluminum, titanium, vanadium, cobalt, nickel and mixtures thereof, in amounts corresponding to 0.1% to 2% by weight on the perfluoropolyether, to obtain the corresponding compounds having a lower molecular weight.

2. The process according to claim 1, in which the fluoride and/or oxyfluoride is formed "in situ" by starting from different compounds of a metal selected from the group consisting of Al, Ti, V, Co, Ni capable of converting to said fluoride and/or oxyfluoride under the reaction conditions.

3. The process according to claim 1 wherein the catalyst is $AlF_3$ having a free acidity degree evaluated as irreversibly $NH_3$ absorbed at 100° C., of at least 2.9 m.eq.KOH/g.

4. The process according to claim 3, in which the $AlF_3$ is furthermore characterized in that it comprises $AlF_3$ of the gamma type or of the delta type or of mixtures thereof.

5. A process for the scission of perfluoropolyethers selected from those having one of the following three formulae:

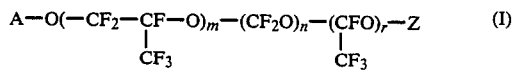

in which A is $-CF_3$; $-C_2F_5$; $-C_3F_7$ and Z is A or an acid group $-COF$ or a derivative thereof, or the group $-CO-CF_3$;

the monomeric units with indexes m, n and r are randomly distributed along the chain of the perfluoropolyether, m, n and r are integers from 0 to 200, the value of m+n+r being always greater than zero;

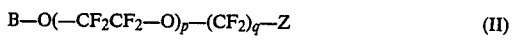

in which

B is $-CF_3$, $-C_2F_5$; and

Z is B or an acid group $-COF$ or a derivative thereof, the monomeric units with indexes p and q being randomly distributed along the chain of the perfluoropolyether, p and q are integers and p/q is from 0.5 to 2, extremes included;

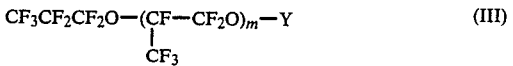

in which

Y is the acyl fluoride group $-CF(CF_3)COF$, and m is an integer greater than zero;

said process comprising heating the perfluoropolyether at a temperature from 150° to 380° C. in the presence of a catalyst obtained in situ from $CoCl_2$ and $NiCl_2$, in amounts corresponding to 0.1% to 2% by weight based on the perfluoropolyether, and flowing fluorine gas into the reaction mixture.

* * * * *